United States Patent
Kupratis et al.

(10) Patent No.: US 9,822,731 B2
(45) Date of Patent: Nov. 21, 2017

(54) CONTROL SCHEME USING VARIABLE AREA TURBINE AND EXHAUST NOZZLE TO REDUCE DRAG

(71) Applicant: United Technologies Corporation, Hartford, CT (US)

(72) Inventors: Daniel Bernard Kupratis, Wallingford, CT (US); Adam Joseph Suydam, Ocala, FL (US); Christopher G. Hugill, West Hartford, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 227 days.

(21) Appl. No.: 14/671,158

(22) Filed: Mar. 27, 2015

(65) Prior Publication Data
US 2016/0280385 A1 Sep. 29, 2016

(51) Int. Cl.
| | |
|---|---|
| *F02K 3/075* | (2006.01) |
| *F02K 3/11* | (2006.01) |
| *F02K 1/00* | (2006.01) |
| *F02K 3/00* | (2006.01) |
| *B64D 31/06* | (2006.01) |
| *F02K 1/17* | (2006.01) |
| *F02C 9/28* | (2006.01) |
| *F02C 9/54* | (2006.01) |

(52) U.S. Cl.
CPC .................. *F02K 1/17* (2013.01); *F02C 9/28* (2013.01); *F02C 9/54* (2013.01); *F02K 3/11* (2013.01)

(58) Field of Classification Search
None
See application file for complete search history.

(56) References Cited

U.S. PATENT DOCUMENTS

| | | | | | |
|---|---|---|---|---|---|
| 3,368,352 | A | * | 2/1968 | Hewson | F02K 3/025 60/224 |
| 3,449,914 | A | * | 6/1969 | Brown | F02K 1/15 405/215 |
| 4,000,854 | A | * | 1/1977 | Konarski | F02K 1/006 239/265.35 |
| 4,064,692 | A | * | 12/1977 | Johnson | F02K 3/075 60/262 |
| 4,080,785 | A | * | 3/1978 | Koff | F02K 3/077 415/69 |

(Continued)

OTHER PUBLICATIONS

European Search Report for European Patent Application No. 16162419 dated Aug. 16, 2016.

*Primary Examiner* — Navid Ziaeianmehdizadeh
(74) *Attorney, Agent, or Firm* — Carlson, Gaskey & Olds, P.C.

(57) ABSTRACT

A method to reduce aerodynamic drag of a engine exhaust/engine nozzle includes collecting data that is indicative of an instant flight condition, entering the data into a decision algorithm that, based on the data, outputs at least first and second drag control parameters corresponding, respectively, to an angle of one or more variable area turbines of a turbine engine and a position of a variable area exhaust nozzle of the turbine engine, and adjusting the angle of the one or more variable area turbines and the position of the variable area exhaust nozzle according to, respectively, the first and second drag control parameters to reduce aerodynamic drag of an engine exhaust/engine nozzle of the turbine engine.

15 Claims, 2 Drawing Sheets

(56) References Cited

U.S. PATENT DOCUMENTS

| | | | | |
|---|---|---|---|---|
| 4,137,708 A | * | 2/1979 | Aspinwall | F02K 7/16 60/204 |
| 4,232,515 A | * | 11/1980 | Brown | F02C 9/54 244/46 |
| 4,337,615 A | * | 7/1982 | LaCroix | F02C 9/28 60/39.281 |
| 9,151,183 B2 | * | 10/2015 | Petty | F01D 25/30 |
| 2005/0257528 A1 | * | 11/2005 | Dunbar | F02K 3/10 60/761 |
| 2010/0107600 A1 | * | 5/2010 | Hillel | F01D 17/08 60/235 |
| 2012/0110975 A1 | * | 5/2012 | Alholm | F02C 7/266 60/39.827 |

* cited by examiner

CONTROL SCHEME USING VARIABLE AREA TURBINE AND EXHAUST NOZZLE TO REDUCE DRAG

BACKGROUND

Control schemes for gas turbine engines are often designed to minimize thrust specific fuel consumption ("TSFC"). For example, the control scheme manipulates fuel flow, turbine performance, and possibly many other engine parameters, to meet or enhance TSFC at a given flight condition. As can be appreciated, given the complexity of a gas turbine engine, there are nearly limitless combinations of parameters and adjustments that can be made to influence TSFC and engine thrust and drag.

SUMMARY

A method to reduce aerodynamic drag of an engine exhaust/engine nozzle, according to an example of the present disclosure includes collecting data that is indicative of an instant flight condition, entering the data into a decision algorithm that, based on the data, outputs at least first and second drag control parameters corresponding, respectively, to an angle of one or more variable area turbines of a turbine engine and a position of a variable area exhaust nozzle of the turbine engine, and adjusting the angle of the one or more variable area turbines and the position of the variable area exhaust nozzle according to, respectively, the first and second drag control parameters to reduce aerodynamic drag of an engine exhaust/engine nozzle of the turbine engine.

In a further embodiment of any of the foregoing embodiments, the data is selected from the group consisting of altitude, ambient air pressure, Mach number, throttle level, ambient air temperature, humidity, aircraft angle of attack and rate of climb, and combinations thereof.

In a further embodiment of any of the foregoing embodiments, the decision algorithm also outputs a third drag control parameter corresponding to a fuel flow ratio between fuel flow to a combustor of the turbine engine and fuel flow to an augmentor of the turbine engine, and adjusting total fuel flow and the fuel flow ratio in accordance with the third drag control parameter to reduce the aerodynamic drag of the engine exhaust/engine nozzle.

In a further embodiment of any of the foregoing embodiments, the decision algorithm also outputs a fourth drag control parameter corresponding to an engine exhaust nozzle pressure ratio of the turbine engine, and adjusting the exhaust nozzle pressure ratio in accordance with the fourth drag control parameter to reduce the aerodynamic drag.

In a further embodiment of any of the foregoing embodiments, the adjusting of the angle and the position result in a controlled change of pressure in the variable area exhaust nozzle to reduce aerodynamic drag of the engine exhaust/engine nozzle.

In a further embodiment of any of the foregoing embodiments, the adjusting of the angle and the position result in a controlled change of temperature in the variable area exhaust nozzle to reduce aerodynamic drag of the engine exhaust/engine nozzle.

In a further embodiment of any of the foregoing embodiments, the adjusting of the angle and the position result in a controlled change of temperature and pressure in the variable area exhaust nozzle to reduce aerodynamic drag of the engine exhaust/engine nozzle.

In a further embodiment of any of the foregoing embodiments, the one or more variable area turbines includes a first variable area turbine in a low-pressure turbine section and a second variable area turbine in a high-pressure turbine section.

An aircraft control system according to an example of the present disclosure includes a turbine engine including at least one variable area turbine and a variable area exhaust nozzle, and a controller configured to collect data that is indicative of an instant flight condition, enter the data into a decision algorithm that, based on the data, outputs at least first and second drag control parameters corresponding, respectively, to an angle of the at least one variable area turbine and a position of the variable area exhaust nozzle, and adjust the angle and the position according to, respectively, the first and second drag control parameters to reduce aerodynamic drag of engine exhaust/engine nozzle of the turbine engine.

In a further embodiment of any of the foregoing embodiments, the turbine engine includes an augmentor.

In a further embodiment of any of the foregoing embodiments, the data is selected from the group consisting of altitude, ambient air pressure, Mach number, throttle level, ambient air temperature, and combinations thereof.

In a further embodiment of any of the foregoing embodiments, the decision algorithm also outputs a third drag control parameter corresponding to a fuel flow ratio between fuel flow to a combustor of the turbine engine and fuel flow to an augmentor of the turbine engine, and the controller is also configured to adjust total fuel flow and the fuel flow ratio in accordance with the third drag control parameter to reduce the aerodynamic drag.

In a further embodiment of any of the foregoing embodiments, the decision algorithm also outputs a fourth drag control parameter corresponding to a pressure ratio of the variable area exhaust nozzle, and the controller is also configured to adjust the pressure ratio in accordance with the fourth drag control parameter to reduce the aerodynamic drag.

In a further embodiment of any of the foregoing embodiments, the at least one variable area turbine includes a first variable area turbine in a low-pressure turbine section and a second variable area turbine in a high-pressure turbine section.

BRIEF DESCRIPTION OF THE DRAWINGS

The various features and advantages of the present disclosure will become apparent to those skilled in the art from the following detailed description. The drawings that accompany the detailed description can be briefly described as follows.

DETAILED DESCRIPTION

Figure 1:
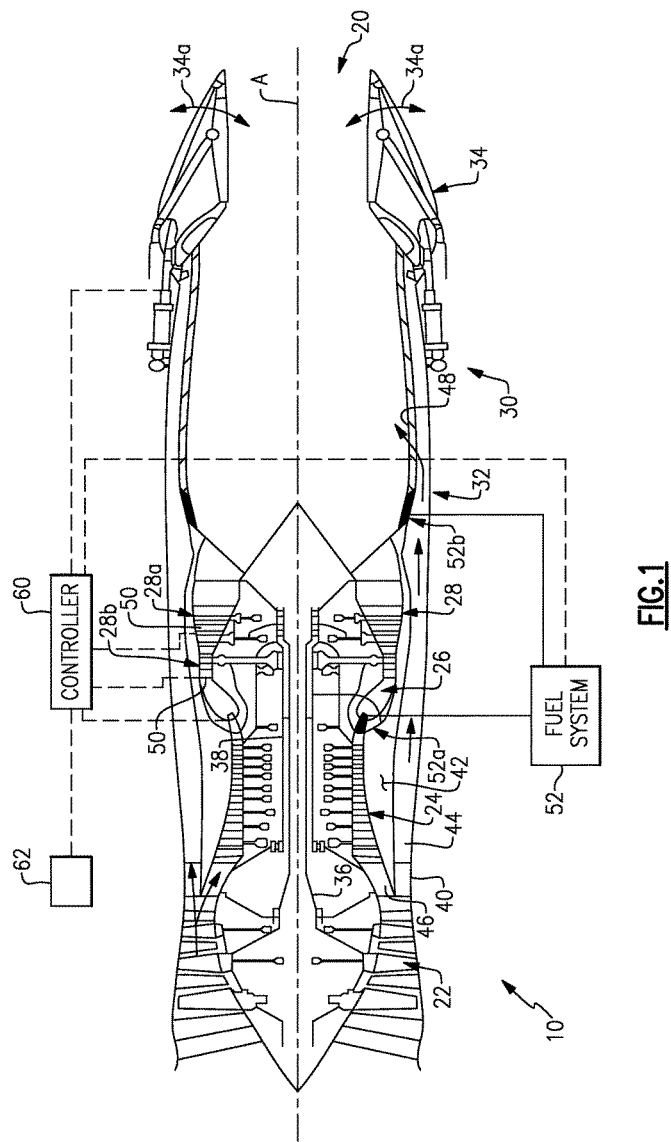
FIG. 1 illustrates an example gas turbine engine with a controller and control scheme configured to reduce aerodynamic drag of an engine exhaust/engine nozzle of the gas turbine engine.

Various engine control schemes are employed to manipulate particular combinations of engine parameters to enhance thrust specific fuel consumption, for example. However, there may be instances where it is less desirable to enhance or minimize TSFC and, instead, enhance or reduce aerodynamic drag of the engine exhaust/engine nozzle. For example, drag may be reduced to temporarily maximize net thrust. FIG. 1 schematically illustrates a gas turbine engine 10 that has an engine exhaust/engine nozzle 20. As will be described, the engine 10 selectively utilizes a control scheme directed to reducing aerodynamic drag of the engine exhaust/engine nozzle 20.

The illustrated gas turbine engine 10 is a two-spool turbofan that includes a fan section 22, a compressor section 24, a combustor section 26, a turbine section 28, and a nozzle section 30 that includes an augmentor 32 and a variable area exhaust nozzle 34. The variable area exhaust nozzle 34 is selectively adjustable, as generally represented by arrows 34a, to open and close flow through the nozzle section 30. The sections of the engine 10 are defined along a central longitudinal axis A.

Although depicted as an augmented, low-bypass gas turbine engine, the examples herein are also applicable to other gas turbine engine architectures, including but not limited to, three-spool engine architectures, multi-bypass-stream engine architectures, geared engine architectures, and direct-drive engine architectures.

The turbine section 28 includes a first (or low-pressure) turbine 28a and a second (or high-pressure) turbine 28b. The first turbine 28a is coupled through a first shaft 36 to drive the fan section 22. The second turbine 28b is coupled through a second shaft 38 to drive the compressor section 24.

An outer engine case structure 40 and an inner engine structure 42 define a generally annular secondary flow path 44 around a core flow path 46 through the compressor section 24, combustor section 26, and turbine section 28. Air from the fan section 22 is divided between a core flow through the core flow path 46 and a secondary flow through the secondary flow path 44. The core flow passes through the compressor section 24, the combustor section 26, the turbine section 28, and then the augmentor section 32. The secondary flow may be utilized for cooling and pressurization of a perforated liner 48 in the nozzle section 30, for example. The secondary flow is at least partially injected into the core flow through the perforated liner 48.

The first turbine section 28a, the second turbine section 28b, or both include a variable area turbine 50. Each such variable area turbine 50 can include a circumferential row of variable angle turbine vanes. For example, such vanes do not rotate about the engine axis A as do turbine blades, but rather the vanes are moveable to pivot about their radial axes to thereby selectively restrain flow through the turbine stage of the variable area turbine 50. In further examples, the mechanism(s) for permitting such pivoting movement may be similar to those known for variable vanes in a compressor.

The engine 10 further includes a fuel system 52 that is configured to deliver fuel 52a to the combustor section 26 and fuel 52b to the augmentor 32, where the fuel 52b may be selectively injected and burned to generate additional thrust through the nozzle section 30. The fuel system 52 can include fuel lines for delivering the fuel, one or more fuel pumps, one or more flow splitter valves, one or more metering valves, or combinations thereof. Thus, the total fuel flow used in the engine 10 can be divided in a controlled fuel flow ratio between fuel flow 52a to the combustor section 26 and fuel flow 52b to the augmentor 32. Generally, a greater fuel flow to the combustor section 26 generates a greater amount of core flow in the turbine section 28 and, in turn, can increase turbine temperature and change turbine pressure ratio, engine pressure ratio, and nozzle pressure. Engine pressure ratio (EPR) is defined as the pressure of the engine flow measured aft of the exit of the low-pressure turbine 28a divided by the pressure of the engine flow measured forward of the inlet of the fan section 22 Greater fuel flow to the augmentor 32 can increase the temperature in the nozzle section 30 and also influence nozzle pressure ratio.

The engine 10 also includes a controller 60 for controlling, at least in part, operation of the engine 10. As can be appreciated, the controller 60 may operate in cooperation with one or more other controllers to control operation of the engine 10. The controller 60 can include hardware, such as a microprocessor, software, or both that are programed to execute the functions described herein by, for example, receiving data, running one or more algorithms to process such data, generate control parameter outputs based on such data and algorithms, and command the operation of the components of the engine 10 in response to the control parameter outputs. In this regard, the controller 60 is in communication with at least a sensor module 62, the one or more variable area turbines 50, the fuel system 52, and the variable area exhaust nozzle 34. In further examples, the controller 60 can be, for example, part of a flight control computer, a portion of a Full Authority Digital Engine Control (FADEC), a stand-alone unit or other system. The controller 60 can include a processor, a memory, and an interface. The processor may be any type of microprocessor having desired performance characteristics. The memory may be any computer readable medium that stores data and control algorithms, such as logic as described herein. The interface facilitates communication with other components, such as valves and actuators.

The sensor module 62 may be in communication with one or more aircraft systems on the aircraft in which the engine 10 is mounted. The aircraft systems can include sensors and the like that collect data indicative of flight conditions. The data can be collected in real-time or near real-time, for example. Such data can be indicative of take-off flight condition, cruise flight condition, a maneuvering flight condition, or other pre-defined flight condition. The data can include, but is not limited to, engine data such as engine pressure ratio (EPR), low shaft 36 rotational speed, high shaft 38 rotational speed and the positions of variable vanes in the fan section 22 and the compressor section 24. The controller 60 collects the data from the sensor module 62 for employing a control scheme or method to reduce aerodynamic drag of the engine exhaust/engine nozzle 20. The data can additionally include, but is not limited to, flight data such as altitude, ambient air pressure, Mach number, engine throttle level, and ambient air temperature. In addition, vehicle-level data can also be used, such as but not limited to, the positions and/or displacements and rotations of the engine inlet variable geometry and wing and/or fuselage lift and drag control surfaces. The controller 60 collects the data from the sensor module 62 for employing a control scheme or method to reduce aerodynamic drag of the engine exhaust/engine nozzle 20.

The controller 60 can be used to facilitate the control of fuel to the combustor section 26, to the augmentor 32, or any combination thereof. The controller 60 can be in communication with one or more isolation valves or other valves described herein. The controller 60 can receive sensory or operator input, processes the input, and output drag control parameters that operate the valve or valves, variable area turbines 50, the fuel system 52, and the variable area exhaust nozzle 34. In this regard, the pumps, and/or valves, actuators and the like may be any variety of metering-like devices, including but not limited to single-body units capable of both pathway isolation and variable flow control. Additionally, the actuator of the variable area turbines 50 can be any variety of structures, including but not limited to, single-body units capable of variable flow control. Additionally, the actuator of the variable area exhaust nozzle 34 also can be any variety of structures, including but not limited to, single-body units capable of variable area flow control.

Figure 2:
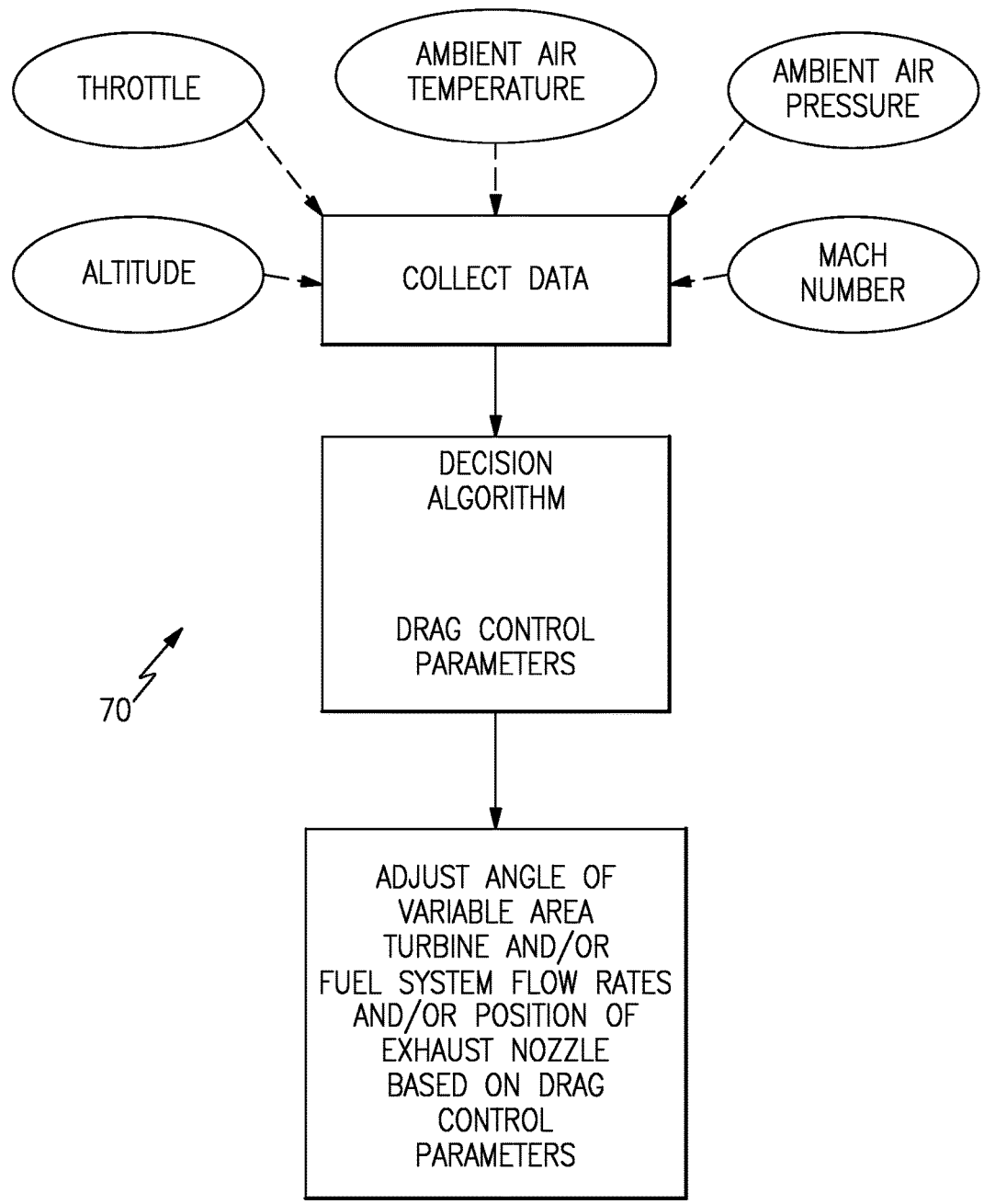
FIG. 2 illustrates an example method to reduce aerodynamic drag of an engine exhaust/engine nozzle of a gas turbine engine.

FIG. 2 illustrates an example method 70 or control scheme which the controller 60 is configured or programmed to selectively employ. The controller 60 collects the data indicative of an instant flight condition. For instance, the data is collected from the sensor module 62 or, alternatively, can be collected from another module, controller, or individual sensors or sensor systems. The controller 60 enters the data into a decision algorithm that, based on the data, outputs at least first and second drag control parameters corresponding, respectively, to an angle of the variable area turbine or turbines 50 and a position of the variable area exhaust nozzle 34. For example, the decision algorithm can include a defined function that outputs the control parameters for given input data, a decision table that maps given input data to output control parameters, or the like, through which changes to angle and position are identified to reduce aerodynamic drag of the engine exhaust/engine nozzle 20.

The controller 60 then adjusts the angle of the variable area turbine or turbines 50 and the position of the variable area exhaust nozzle 34 according to, respectively, the first and second drag control parameters to reduce aerodynamic drag of the engine exhaust/engine nozzle 20. For example, the adjustment of the angle can be an incremental change in the angle from an instant angle and the adjustment of the position can be an incremental change in the position from an instant position.

In a further example, the decision algorithm also outputs a third drag control parameter corresponding to the fuel flow ratio between the fuel flow to the combustor section 26 and the fuel flow to the augmentor 32, and adjusts total fuel flow and the fuel flow ratio in accordance with the third drag control parameter to reduce the aerodynamic drag of the engine exhaust/engine nozzle 20.

In a further example, the decision algorithm also outputs a fourth drag control parameter corresponding to the pressure ratio of the nozzle section 30, and adjusts the pressure ratio in accordance with the fourth drag control parameter to reduce the aerodynamic drag of the engine exhaust/engine nozzle 20.

The angle, the position, the fuel flow ratio, and the pressure ratio are thus manipulated to change an engine condition that influences drag of the engine exhaust/engine nozzle. For example, the angle, the position, the fuel flow ratio, and the pressure ratio are manipulated to change the pressure, the temperature, or both in the nozzle section 30, to thereby reduce aerodynamic drag of the engine exhaust/engine nozzle 20. Experimental data and/or data simulations can be used to generate a decision algorithm. For instance, the experiments and/or simulations are used to identify the influence of changes in angle, position, fuel flow ratio, and engine pressure ratio on the pressure and temperature in the nozzle section 30 at various flight conditions represented by the input data, such as altitude, ambient air pressure, Mach number, throttle level, ambient air temperature, or combinations thereof. In turn, experiments and/or simulations are also used to identify the influence of variations in the pressure and temperature in the nozzle section 30 on aerodynamic drag of the engine exhaust/engine nozzle 20. Thus, a profile or matrix can be compiled that maps angles, positions, fuel flow rates, and/or pressure ratios that provide low drag to given flight conditions. For a given instant flight condition and instant angle, position, fuel flow ratio, or pressure ratio, a lower drag angle, position, fuel flow ratio, or pressure ratio can be identified and adjusted accordingly.

The influence on drag of the engine exhaust/engine nozzle 20 can vary with the particular design and architecture of the engine and the particular design and architecture of the aircraft. For example, the drag relates to the interaction between the engine exhaust/engine nozzle 20 and the airflow around the engine and aircraft. For instance, while a pressure increase and temperature increase may reduce drag in one engine/aircraft system, the same pressure and temperature increase in another engine/aircraft system may increase drag. It is thus impractical to identify particular control schemes herein because of such variance. Rather, given this disclosure, a particular engine design and architecture, and a particular design and architecture of an aircraft, the skilled worker will be able to identify through experiment, simulation, or both, the influence of changes in angle, position, fuel flow ratio, and engine pressure on the pressure and temperature in the exhaust nozzle section 30 at various flight conditions and the influence of variations in the pressure and temperature in the nozzle section 30 on aerodynamic drag of the particular engine exhaust/engine nozzle in order to construct a decision algorithm.

Table 1 below represents an example of a decision algorithm. $Data_{n1}$ through $data_{ni}$ is indicative of instant flight conditions. Based on the data, the decision algorithm identifies a desired angle and/or position, designated in Table 1 as the control angle and control position, respectively, that reduces drag of the engine exhaust/engine nozzle 20. The control angle and control position are compared to the instant angle and instant position to identify a change in angle (Δ angle) and/or change in position (Δ position). The change in angle in this example is drag control parameter 1 and the change in position is the drag control parameter 2. Likewise, there may be drag control parameters 3 and 4 for fuel flow ratio and pressure ratio across the liner 48. For example, for data inputs A, B, and C, the identified angle for low drag is 12. The instant angle is 10 such that a change in angle of +2 is needed to obtain the low drag condition. The identified position for low drag is 17. The instant position is 14 such that a change in position of +3 is needed to obtain the low drag condition. The controller 60 thus would adjust the angle by +2 and the position by +3 to reduce drag of the engine exhaust/engine nozzle 20.

TABLE 1

Decision algorithm table.

| Data $n_1$ | Data $n_2$ | ... Data $n_i$ | Instant Angle | Control Angle | Δ Angle Drag Control Paramter 1 |
|---|---|---|---|---|---|
| A | B | C | 10 | 12 | +2 |
| D | E | F | 13 | 10 | −3 |
| G | H | I | 12 | 6 | −6 |
| J | K | L | 8 | 11 | +3 |

| Data 1 | Data 2 | ... Data $n_i$ | Instant Position | Control Position | Δ Position Drag Control Paramter 2 |
|---|---|---|---|---|---|
| A | B | C | 14 | 17 | +3 |
| D | E | F | 17 | 13 | −4 |
| G | H | I | 21 | 25 | +4 |
| J | K | L | 19 | 18 | −1 |

The Table 2 below represents another example of a decision algorithm. The data inputs in this example are Mode, Flight Condition, and Engine Thrust. Based on the data, the decision algorithm identifies a desired angle and/or position condition, designated in Table 2 under Control System, Fuel System, and Exhaust, to obtain a desired drag condition of the engine exhaust/engine nozzle 20, represented in the last column in the table.

TABLE 2

Decision algorithm table.

| | | | Control System | | | Fuel System | | Exhaust | | |
|---|---|---|---|---|---|---|---|---|---|---|
| Mode | Fight Condition | Engine Thrust | HPT Vane | LPT Vane | Nozzle Area | Engine | Augmentor | Nozzle Pressure | BPR | Nozzle Drag |
| Max Power | Dash | High | Open | Open | High | Medium | High | High | Low | Low |
| Mil Power | Transonic Accel | Medium | Open | Nominal | Low | High | zero | High | Medium | Low |
| Cause Power | Cruise | Low | Closed | Open | Medium | Low | zero | Low | High | Low |

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from this disclosure. The scope of legal protection given to this disclosure can only be determined by studying the following claims.

What is claimed is:

1. A method to reduce aerodynamic drag of an engine exhaust or nozzle, the method comprising:
   collecting data that is indicative of an instant flight condition;
   entering the data into a decision algorithm that, based on the data, outputs first and second drag control parameters corresponding, respectively, to an angle of one or more variable area turbines of a turbine engine and a position of a variable area exhaust nozzle of the turbine engine, and the decision algorithm also outputs a third drag control parameter corresponding to a fuel flow ratio between fuel flow to a combustor of the turbine engine and fuel flow to an augmentor of the turbine engine; and
   adjusting the angle of the one or more variable area turbines and the position of the variable area exhaust nozzle according to, respectively, the first and second drag control parameters to reduce aerodynamic drag of an engine exhaust or nozzle of the turbine engine, and adjusting total fuel flow and the fuel flow ratio in accordance with the third drag control parameter to reduce the aerodynamic drag of the engine exhaust and nozzle.

2. The method as recited in claim 1, wherein the data is selected from the group consisting of altitude, ambient air pressure, Mach number, throttle level, ambient air temperature, humidity, aircraft angle of attack and rate of climb, and combinations thereof.

3. The method as recited in claim 1, wherein the decision algorithm also outputs a fourth drag control parameter corresponding to an engine exhaust nozzle pressure ratio of the turbine engine, and adjusting the exhaust nozzle pressure ratio in accordance with the fourth drag control parameter to reduce the aerodynamic drag.

4. The method as recited in claim 1, wherein the adjusting of the angle and the position result in a controlled change of pressure in the variable area exhaust nozzle to reduce aerodynamic drag of the engine exhaust or nozzle.

5. The method as recited in claim 1, wherein the adjusting of the angle and the position result in a controlled change of temperature in the variable area exhaust nozzle to reduce aerodynamic drag of the engine exhaust or nozzle.

6. The method as recited in claim 1, wherein the adjusting of the angle and the position result in a controlled change of temperature and pressure in the variable area exhaust nozzle to reduce aerodynamic drag of the engine exhaust or nozzle.

7. The method as recited in claim 1, wherein the one or more variable area turbines includes a first variable area turbine in a low-pressure turbine section and a second variable area turbine in a high-pressure turbine section.

8. The method as recited in claim 1, wherein the data includes i) engine data selected from the group consisting of engine pressure ratio, shaft rotational speed, positions of variable vanes, and combinations thereof, ii) flight data selected from the group consisting of altitude, ambient air pressure, Mach number, engine throttle level, ambient air temperature, and combination thereof, and iii) vehicle-level data selected from the group consisting of positions of an engine inlet, displacements of the engine inlet, rotations of the engine inlet, wing or fuselage lift and drag control surfaces, and combinations thereof.

9. The method as recited in claim 8, wherein the adjusting of the angle and the position result in a controlled change of temperature and pressure in the variable area exhaust nozzle to reduce aerodynamic drag of the engine exhaust and nozzle.

10. An aircraft control system comprising:
   a turbine engine including at least one variable area turbine and a variable area exhaust nozzle; and
   a controller configured to collect data that is indicative of an instant flight condition, enter the data into a decision algorithm that, based on the data, outputs first and second drag control parameters corresponding, respectively, to an angle of the at least one variable area turbine and a position of the variable area exhaust nozzle, and the decision algorithm also outputs a third drag control parameter corresponding to a fuel flow ratio between fuel flow to a combustor of the turbine engine and fuel flow to an augmentor of the turbine engine, adjust the angle and the position according to, respectively, the first and second drag control parameters to reduce aerodynamic drag of engine exhaust or nozzle of the turbine engine, and adjust total fuel flow and the fuel flow ratio in accordance with the third drag control parameter to reduce the aerodynamic drag of the engine exhaust and nozzle.

11. The aircraft control system as recited in claim 10, wherein the data is selected from the group consisting of altitude, ambient air pressure, Mach number, throttle level, ambient air temperature, and combinations thereof.

12. The aircraft control system as recited in claim 10, wherein the decision algorithm also outputs a fourth drag control parameter corresponding to a pressure ratio of the variable area exhaust nozzle, and the controller is also configured to adjust the pressure ratio in accordance with the fourth drag control parameter to reduce the aerodynamic drag.

13. The aircraft control system as recited in claim 10, wherein the at least one variable area turbine includes a first variable area turbine in a low-pressure turbine section and a second variable area turbine in a high-pressure turbine section.

14. The aircraft control system as recited in claim 10, wherein the data includes i) engine data selected from the group consisting of engine pressure ratio, shaft rotational speed, positions of variable vanes, and combinations thereof, ii) flight data selected from the group consisting of altitude, ambient air pressure, Mach number, engine throttle level, ambient air temperature, and combination thereof, and iii) vehicle-level data selected from the group consisting of positions of an engine inlet, displacements of the engine inlet, rotations of the engine inlet, wing or fuselage lift and drag control surfaces, and combinations thereof.

15. The aircraft control system as recited in claim 14, wherein the decision algorithm also outputs a fourth drag control parameter corresponding to a pressure ratio of the variable area exhaust nozzle, and the controller is also configured to adjust the pressure ratio in accordance with the fourth drag control parameter to reduce the aerodynamic drag.

* * * * *